US012452807B2

(12) United States Patent
Tripathi et al.

(10) Patent No.: US 12,452,807 B2
(45) Date of Patent: Oct. 21, 2025

(54) EFFICIENT PRACH TRANSMISSION IN A FALLBACK RACH PROCEDURE

(71) Applicant: Apple Inc., Cupertino, CA (US)

(72) Inventors: Pranav Tripathi, San Jose, CA (US); Dhiraj J. Shirke, San Jose, CA (US); Imran Haider G. Balsania, San Jose, CA (US); Sanjeevi Balasubramanian, San Jose, CA (US)

(73) Assignee: Apple Inc., Cupertino, CA (US)

( * ) Notice: Subject to any disclaimer, the term of this patent is extended or adjusted under 35 U.S.C. 154(b) by 398 days.

(21) Appl. No.: 17/822,952

(22) Filed: Aug. 29, 2022

(65) Prior Publication Data

US 2023/0099913 A1     Mar. 30, 2023

Related U.S. Application Data

(60) Provisional application No. 63/261,596, filed on Sep. 24, 2021.

(51) Int. Cl.
*H04W 74/0833*     (2024.01)
*H04W 56/00*     (2009.01)
*H04W 74/00*     (2009.01)
*H04W 52/36*     (2009.01)

(52) U.S. Cl.
CPC ..... *H04W 74/0833* (2013.01); *H04W 56/001* (2013.01); *H04W 74/004* (2013.01); *H04W 52/367* (2013.01)

(58) Field of Classification Search
CPC ........... H04W 74/0833; H04W 56/001; H04W 74/004; H04W 52/367
See application file for complete search history.

(56) References Cited

U.S. PATENT DOCUMENTS

| 2020/0404711 | A1 | 12/2020 | Zhao et al. | |
| 2022/0030640 | A1* | 1/2022 | Shi | H04W 52/50 |
| 2022/0174749 | A1* | 6/2022 | Ohara | H04W 74/0841 |
| 2022/0377812 | A1* | 11/2022 | Jung | H04L 1/0061 |

FOREIGN PATENT DOCUMENTS

| CA | 3 132 267 | 10/2020 |
| CN | 108271275 | 7/2018 |
| CN | 111527788 | 8/2019 |
| WO | 2021/046792 | 3/2021 |

* cited by examiner

*Primary Examiner* — Jackie Zuniga Abad

(74) *Attorney, Agent, or Firm* — Fay Kaplun & Marcin, LLP

(57) ABSTRACT

A user equipment (UE) is configured to initiate a two-step random access channel (RACH) procedure to synchronize with a base station, initiate a fallback four-step RACH procedure after the two-step RACH procedure, configure a random access preamble transmission for the four-step RACH procedure, wherein configuring the random access preamble transmission comprises deriving a physical random access channel (PRACH) transmit power parameter value based on a parameter used to perform a transmission during the two-step RACH procedure and transmit the random access preamble for the four-step RACH procedure to the base station.

20 Claims, 11 Drawing Sheets

US 12,452,807 B2

EFFICIENT PRACH TRANSMISSION IN A FALLBACK RACH PROCEDURE

PRIORITY/INCORPORATION BY REFERENCE

This application claims priority to U.S. Provisional Application Ser. No. 63/261,596 entitled, "Efficient PRACH Transmission in a Fallback RACH Procedure," filed on Sep. 24, 2022, the entirety of which is incorporated by reference herein.

BACKGROUND

A user equipment (UE) may perform a random access channel (RACH) procedure to synchronize with a base station. In some networks, the UE may initially attempt a two-step RACH procedure. If the two-step RACH procedure is unsuccessful, the UE may fallback to a four-step RACH procedure.

SUMMARY

Some exemplary embodiments are related to a processor of a user equipment (UE) configured to perform operations. The operations include initiating a two-step random access channel (RACH) procedure to synchronize with a base station, initiating a fallback four-step RACH procedure after the two-step RACH procedure, configuring a random access preamble transmission for the four-step RACH procedure, wherein configuring the random access preamble transmission comprises deriving a physical random access channel (PRACH) transmit power parameter value based on a parameter used to perform a transmission during the two-step RACH procedure and transmitting the random access preamble for the four-step RACH procedure to the base station.

Other exemplary embodiments are related to a user equipment (UE) having a transceiver configured to communicate with a base station and a processor communicatively coupled to the transceiver and configured to perform operations. The operations include initiating a two-step random access channel (RACH) procedure to synchronize with the base station, initiating a fallback four-step RACH procedure after the two-step RACH procedure, configuring a random access preamble transmission for the four-step RACH procedure, wherein configuring the random access preamble transmission comprises deriving a physical random access channel (PRACH) transmit power parameter value based on a parameter used to perform a transmission during the two-step RACH procedure and transmitting the random access preamble for the four-step RACH procedure to the base station.

Still further exemplary embodiments are related to a method that includes initiating a two-step random access channel (RACH) procedure to synchronize with a base station, initiating a fallback four-step RACH procedure after the two-step RACH procedure, configuring a random access preamble transmission for the four-step RACH procedure, wherein configuring the random access preamble transmission comprises deriving a physical random access channel (PRACH) transmit power parameter value based on a parameter used to perform a transmission during the two-step RACH procedure and transmitting the random access preamble for the four-step RACH procedure to the base station.

DETAILED DESCRIPTION

Figure 1:
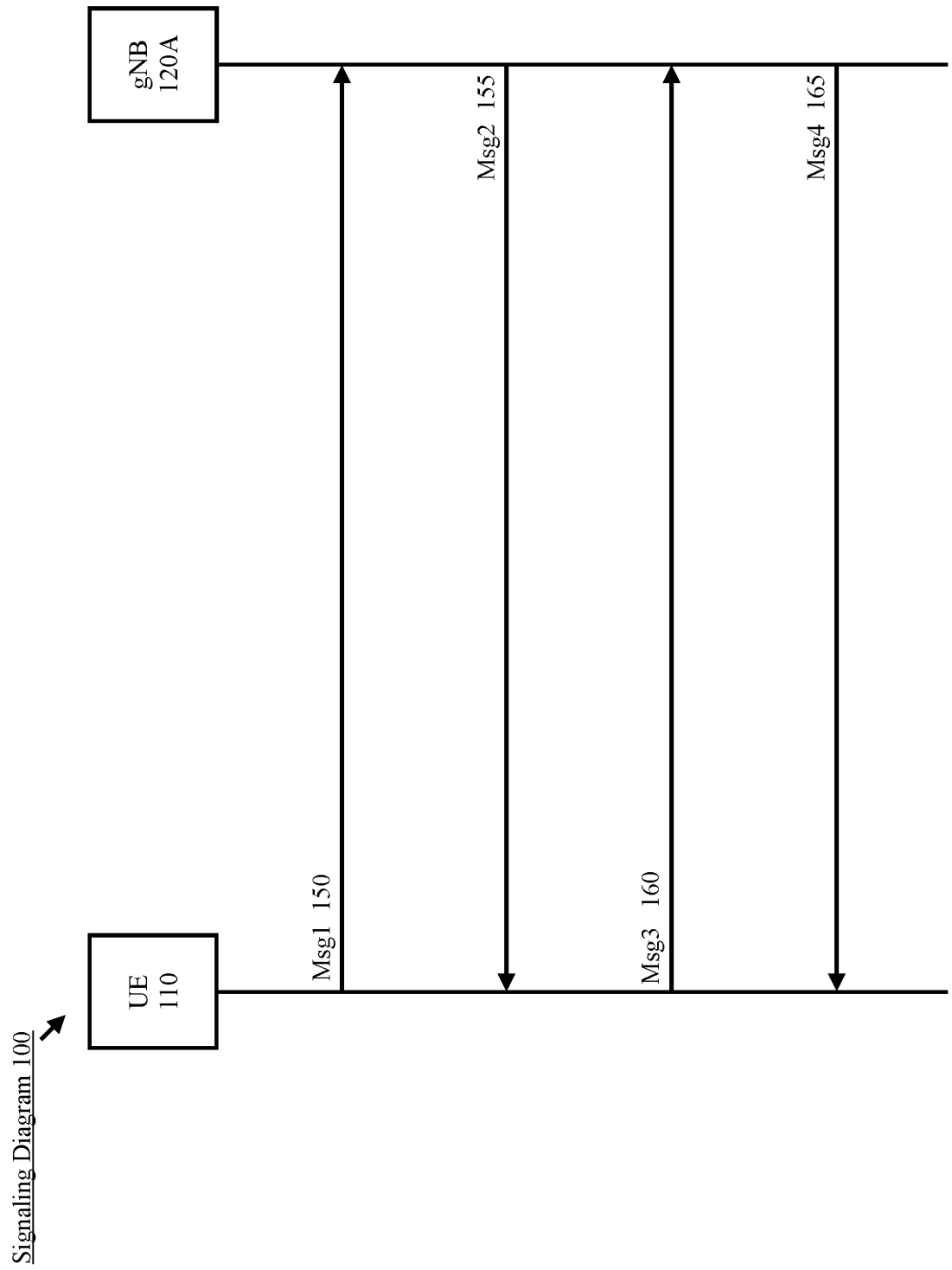
FIG. 1 shows a signaling diagram for a four-step random access channel (RACH) procedure according to various exemplary embodiments.

The exemplary embodiments may be further understood with reference to the following description and the related appended drawings, wherein like elements are provided with the same reference numerals. The exemplary embodiments relate to a user equipment (UE) configured to fallback to a four-step RACH procedure when a two-step RACH procedure is unsuccessful. The exemplary embodiments introduce techniques that may reduce the latency, signaling overhead and power drain associated with a fallback four-step RACH procedure.

The exemplary embodiments are described with regard to the UE participating in a signaling exchange with a next generation node B (gNB) of a fifth generation (5G) new radio (NR) network. The UE as described herein is used to represent any suitable electronic device that is configured with the hardware, software, and/or firmware to exchange information (e.g., control information) and/or data with a network. Further, reference to the gNB and the 5G NR network is provided as an example and is not intended to limit the exemplary embodiments in any way. The exemplary embodiments may apply to any type of base station or access node configured to participate in the fallback four-step RACH procedure and deployed within any appropriate type of network.

The UE may perform the RACH procedure to synchronize with the gNB. To provide some examples, the UE may perform the RACH procedure for initial access or to establish a radio resource control (RRC) connected state. Those skilled in the art will understand that the terms "two-step RACH procedure" and "four-step RACH procedure" refer to third generation partnership project (3GPP) defined procedures. The two-step RACH procedure comprises two particular types of messages, e.g., msgA and msgB. A general overview of the two-step RACH procedure is provided below with regard to the signaling diagram 200 of FIG. 2.

The four-step RACH procedure comprises four particular types of messages, e.g., msg1, msg2, msg3 and msg4. A general overview of the four-step RACH procedure is provided below with regard to the signaling diagram 100 of FIG. 1.

As indicated above, the UE may be configured to fallback to the four-step RACH procedure if the two-step RACH procedure is not successful. An example of this type of fallback scenario is provided below with regard to the signaling diagram 300 of FIG. 3.

The exemplary embodiments introduce techniques related to the transmission of msg1 for a fallback four-step RACH procedure. As will be described in more detail below, the exemplary techniques increase the likelihood of receiving a response to the transmission of msg1 and thus, increase the likelihood of a successful four-step RACH procedure. These exemplary techniques may be utilized in conjunction with currently implemented four-step RACH procedures, future implementations of four-step RACH procedures or independently from other four-step RACH procedures. Specific examples of each of these exemplary techniques will be provided in detail below.

FIG. 1 shows a signaling diagram 100 for a four-step RACH procedure according to various exemplary embodiments. The signaling diagram 100 provides a general overview of a four-step RACH procedure and includes a UE 110 and a gNB 120A.

In 150, the UE 110 transmits a random access preamble (e.g., msg1) to the gNB 120A. The random access preamble may be transmitted over the PRACH. In 155, in response to msg1, the gNB 120A transmits a random access response (RAR) (e.g., msg2) to the UE 110. The RAR may comprise an indication that the random access preamble was successfully received and other information such as, but not limited to, resource allocation information for subsequent RACH procedure transmissions (e.g., msg3, etc.).

In 160, the UE 110 transmits a RRC connection request (e.g., msg3) to the gNB 120A. Those skilled in the art will understand that the RRC connection request is one example of msg3. The contents and type of message that is configured as msg3 may vary depending on the relevant scenario. However, msg3 is beyond the scope of the exemplary embodiments.

In 165, the gNB 120A transmits a contention resolution message (e.g., msg4) to the UE 110. In some embodiments, during or after the RACH procedure, the UE 110 may transmit a hybrid automatic request (HARQ) acknowledgement (ACK) in response to msg4.

Figure 2:
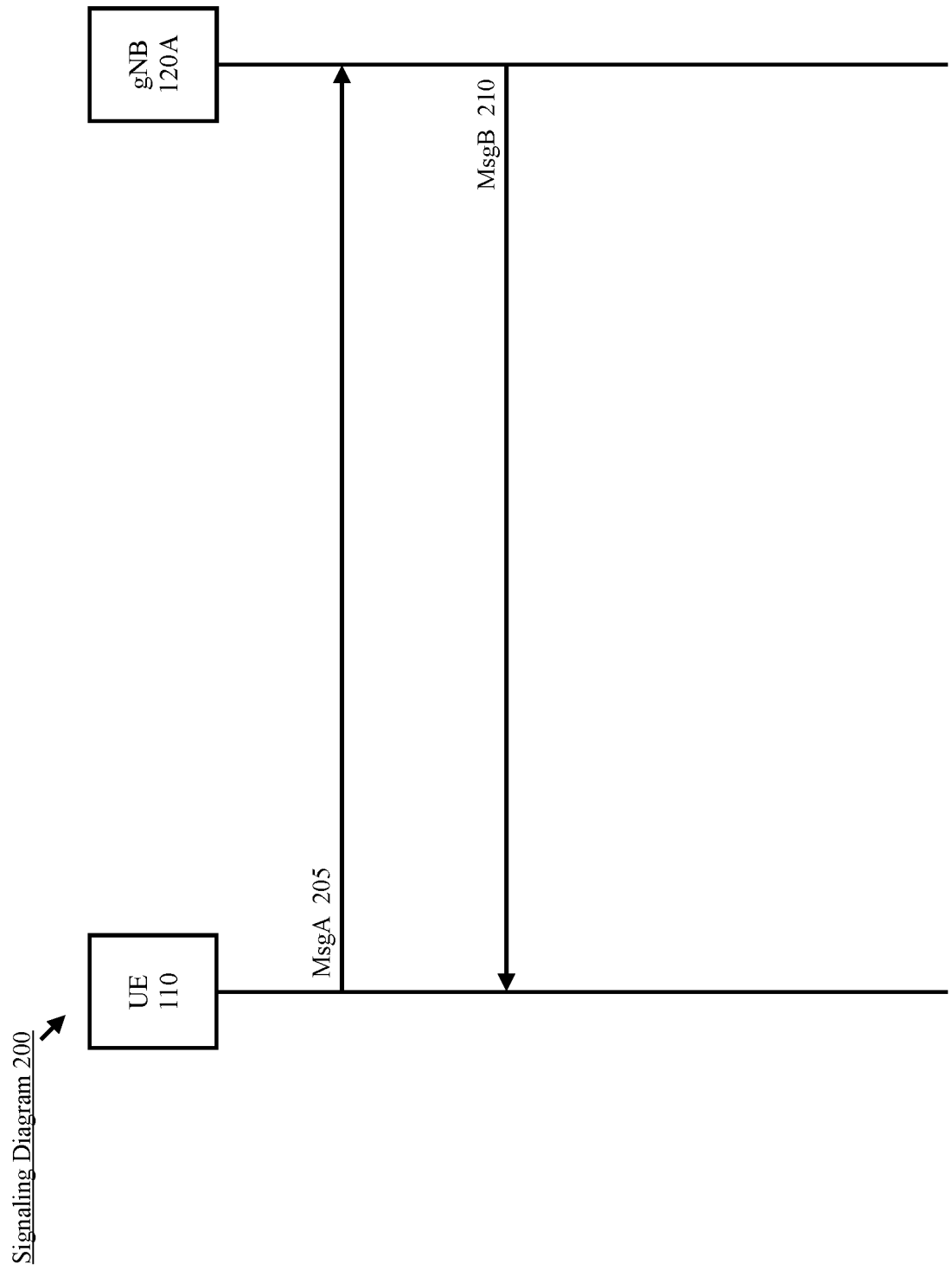
FIG. 2 shows a signaling diagram for a two-step RACH procedure according to various exemplary embodiments.

FIG. 2 shows a signaling diagram 200 for a two-step RACH procedure according to various exemplary embodiments. The signaling diagram 200 provides a general overview of a two-step RACH procedure and includes the UE 110 and the gNB 120A.

In 205, the UE 110 transmits a random access preamble and PUSCH data (e.g., msgA) to the gNB 120A. The random access preamble may be a PRACH transmission. Generally, msgA may be represented as a combination of msg1 and msg3. In 210, the gNB 120A transmits a RAR to the UE 110 (e.g., msgB). Generally, msgB may be represented as a combination of msg2 and msg4.

Figure 3:
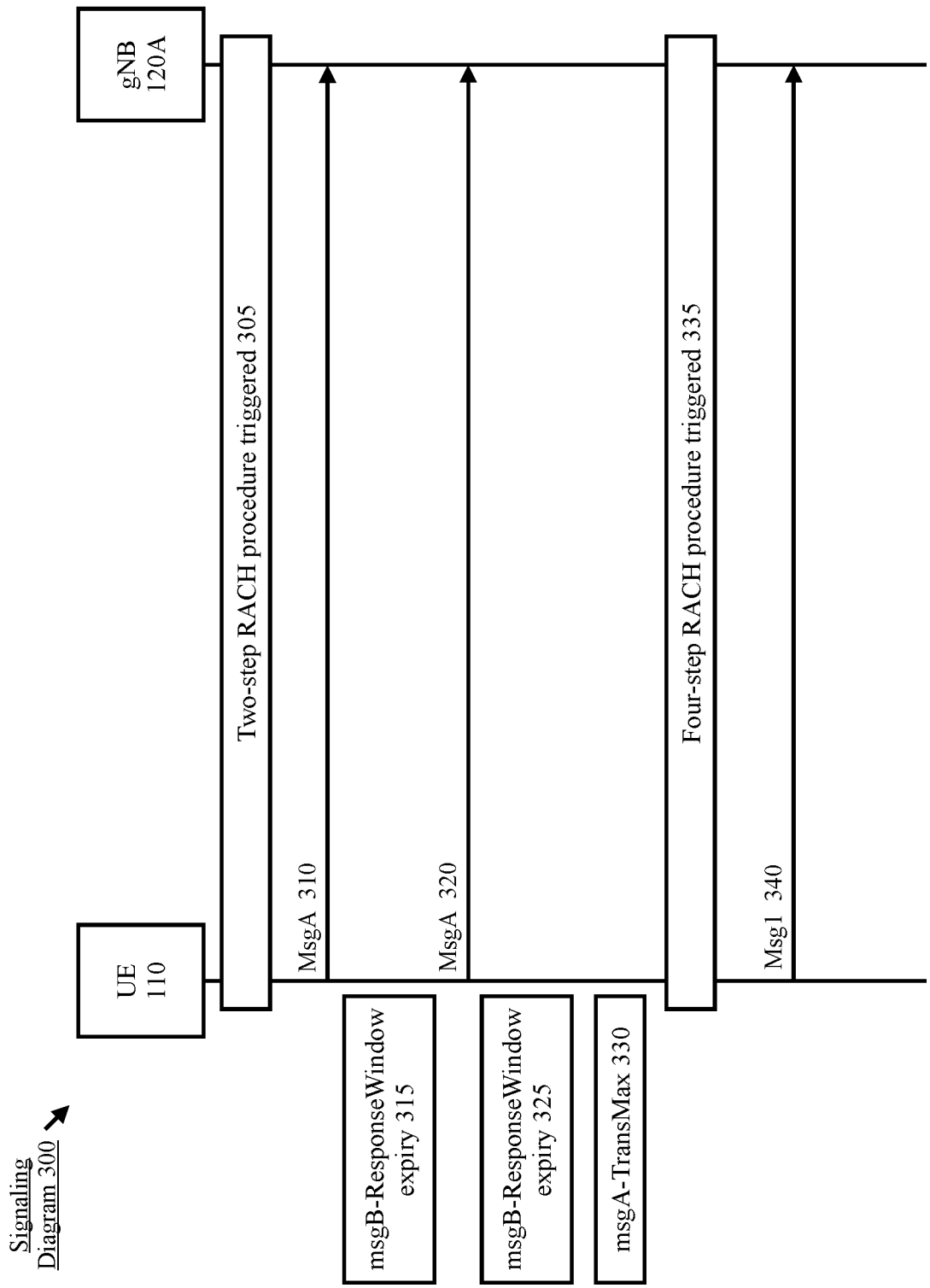
FIG. 3 shows a signaling diagram illustrating an example scenario in which a fallback four-step RACH procedure is performed after a two-step RACH procedure fails according to various exemplary embodiments.

FIG. 3 shows a signaling diagram 300 illustrating an example scenario in which a fallback four-step RACH procedure is performed after a two-step RACH procedure fails. The signaling diagram 300 includes the UE 110 and the gNB 120A.

In 305, a two-step RACH procedure is triggered. In 310, the UE 110 transmits msgA to the gNB 120A. The UE 110 may operate a timer (e.g., msgB-ResponseWindow) related to the reception of msgB in response to the transmission of msgA. If the timer expires before msgB is received, the UE 110 may be configured to retransmit msgA.

In this example, msgB is not received in response to msgA. Accordingly, in 315, the timer expires. In 320, the UE 110 retransmits msgA to the gNB 120A. Once again, msgB is not received in response to msgA. Accordingly, in 325, the timer (e.g., msgB-ResponseWindow) expires. In the signaling diagram 300, this process of transmitting msgA and not receiving a corresponding msgB continues until the random access preamble for msgA has been transmitted a preconfigured maximum number of times (e.g., msgA-TransMax) as shown in 330.

The UE 110 may be configured to fallback to the four-step RACH procedure when the two-step RACH procedure fails due to triggering msgA-TransMax. In 335, the UE 110 switches to the four-step RACH procedure. In 340, the UE 110 transmits msg1 to the gNB 120A in accordance with the four-step RACH procedure. Subsequently, the four-step RACH procedure may fail and the UE 110 may attempt a RACH procedure with a different base station or the four-step RACH procedure may be performed as shown in the signaling diagram 100 of FIG. 1.

The exemplary embodiments introduce techniques related to the transmission of msg1 in the fallback four-step RACH procedure. An example of this transmission is shown by 340 in the signaling diagram 300 of FIG. 3. However, while these exemplary techniques may provide benefits to the type of scenario illustrated by the signaling diagram 300, the exemplary embodiments are not limited to the scenario depicted in the signaling diagram 300. The exemplary embodiments may apply to any scenario in which the UE 110 performs a two-step RACH procedure on a target node and then performs a four-step RACH procedure on the same node.

Figure 4:
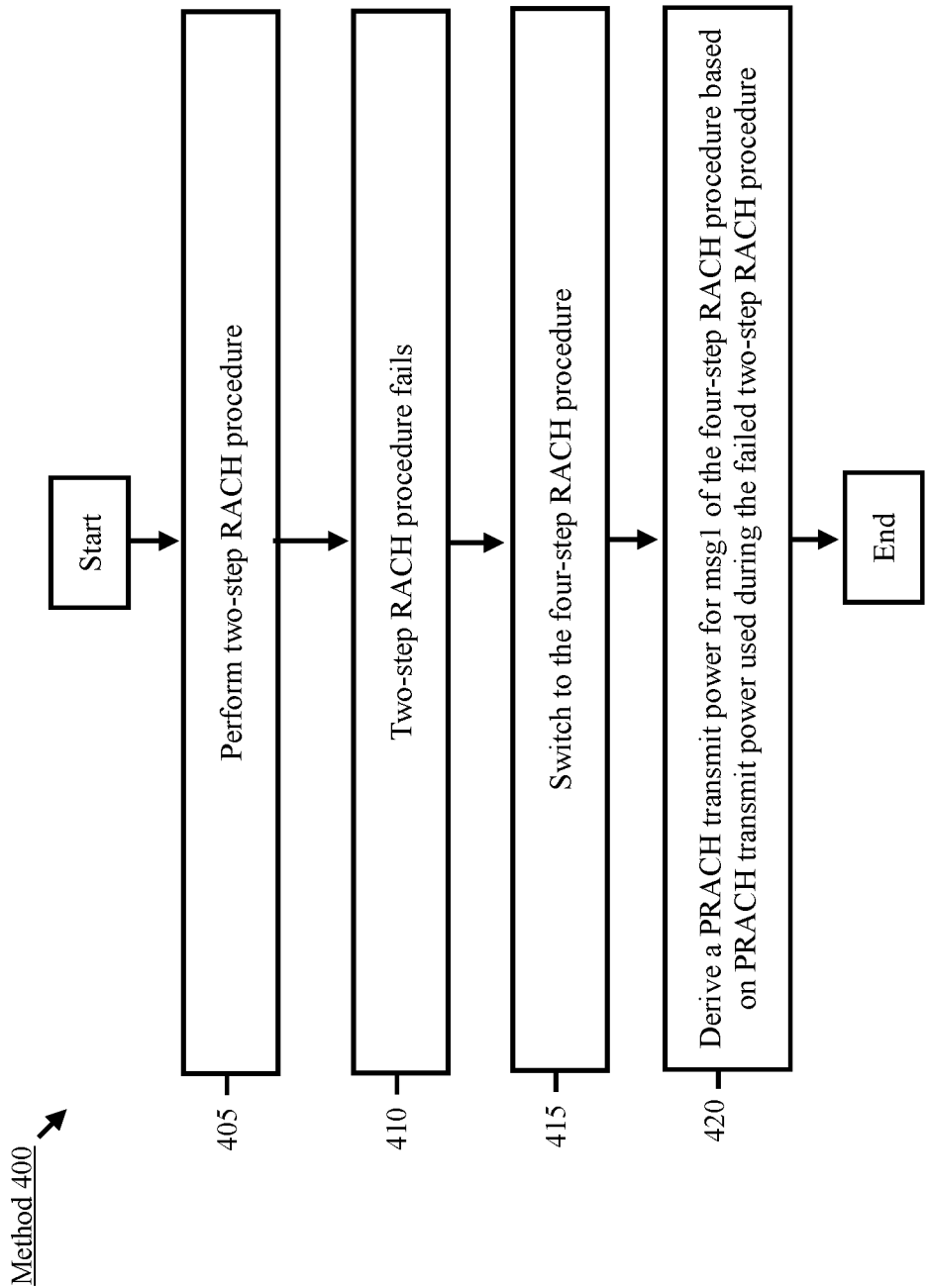
FIG. 4 shows a method for configuring a random access preamble transmission of a fallback four-step RACH procedure according to various exemplary embodiments.

FIG. 4 shows a method 400 for configuring a random access preamble transmission for a fallback four-step RACH procedure according to various exemplary embodiments. The method 400 is described from the perspective of the UE 110 and with reference to the signaling diagram 300 in FIG. 3.

In 405, the UE 110 performs a two-step RACH procedure. In 410, the two-step RACH procedure fails. An example of a two-step RACH procedure failure due to triggering msgA-TransMax was provided above with regard to 305-330 of the signaling diagram 300. As will be described in more detail below, the UE 110 may utilize information associated with the failed two-step RACH procedure to configure the four-step RACH procedure.

Figure 5:
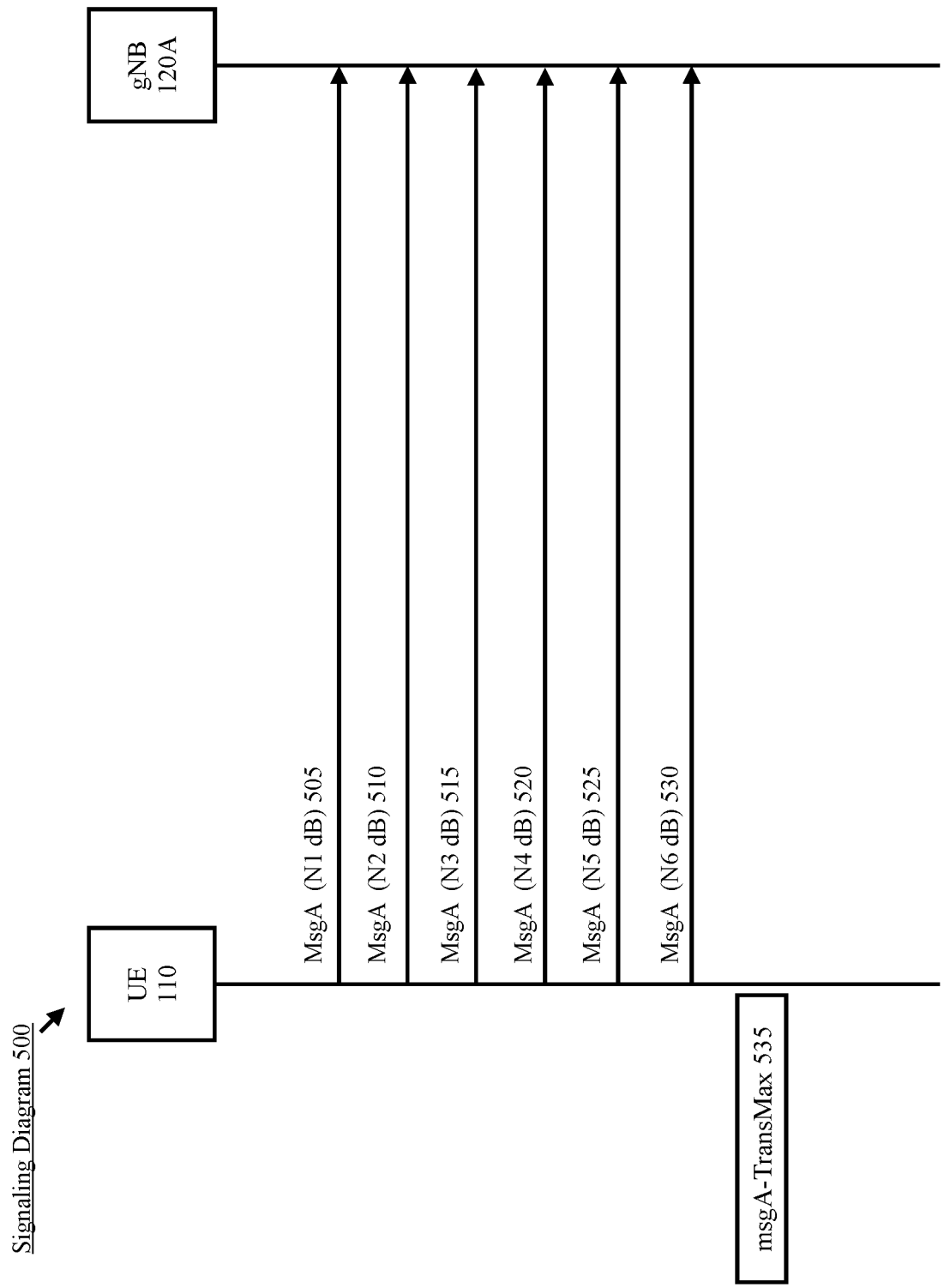
FIG. 5 shows a signaling diagram illustrating one example of performing multiple msgA transmissions during a failed two-step RACH procedure according to various exemplary embodiments.

FIG. 5 shows a signaling diagram 500 illustrating one example of performing multiple msgA transmissions during a failed two-step RACH procedure according to various exemplary embodiments. In this example, the UE 110 transmits msgA six times 505-530 without receive a msgB in response. In 535, the preconfigured maximum number of transmissions of the random access preamble for msg A (e.g., msgA-TransMax) is triggered. Ion the example of FIG. 5, it may be considered that each subsequent transmission of msgA is performed using a different higher PRACH transmit power. To demonstrate the different PRACH transmit power parameters configured for each transmission 505-530 a value N1-N6 measured in units of decibels (dB) is provided. This example is not intended to limit the exemplary embodiments in any way. Instead, this example is merely provided to illustrate that during a failed two-step RACH procedure the UE 110 may transmit msgA multiple times using a different PRACH transmit power parameter value each time.

Returning to the method 400, in 415, the UE 110 switches to a four-step RACH procedure. The UE 110 may be configured to fallback to the four-step RACH procedure when the parameter msgA-TransMax is triggered or in response to any other appropriate condition.

In 420, the UE 110 derives a PRACH transmit power for msg1 of the four-step RACH procedure based on PRACH transmit power used during the failed two-step RACH procedure. Prior to discussing the exemplary techniques, an example of the legacy approach is provided below with regard to FIG. 6.

Figure 6:
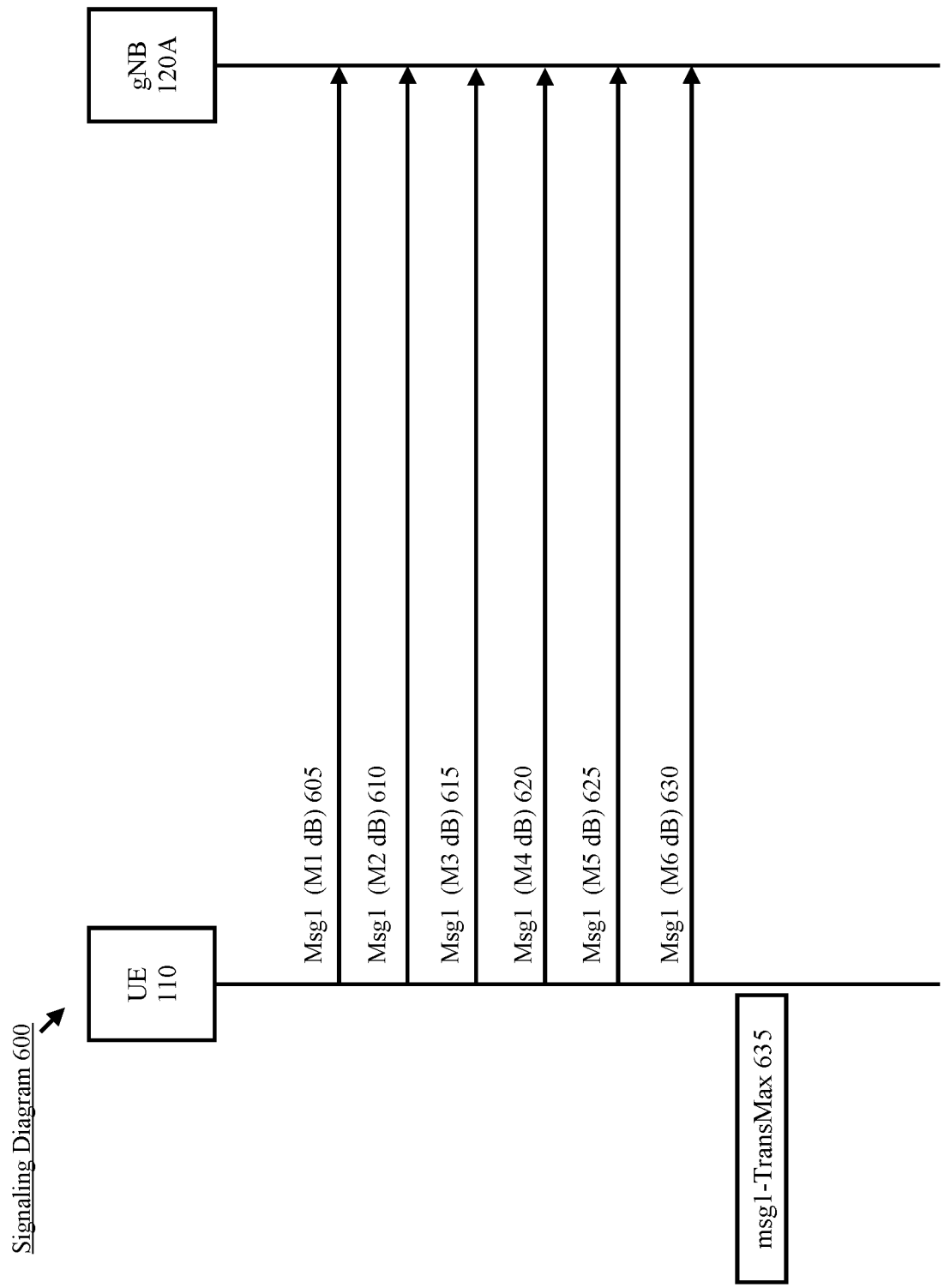
FIG. 6 shows a signaling diagram illustrating an example of performing multiple transmissions of msg1 during the fallback four-step RACH procedure according to various exemplary embodiments.

FIG. 6 shows a signaling diagram 600 illustrating an example of performing multiple transmissions of msg1 during the fallback four-step RACH procedure. In this example, the UE 110 transmits msg1 six times 605-630 without receiving a msg2. In 635, a preconfigured maximum number of transmissions of the random access preamble for msg 1 is triggered (e.g., msg1-TransMax). Here, each subsequent transmission of msg1 is performed using a different higher PRACH transmit power. To demonstrate the different PRACH transmit power parameters each transmission 605-630 is labeled with a value M1-M6 measured in units of (dB). This example is not intended to limit the exemplary embodiments in any way. Instead, this example is merely provided to illustrate that during a four-step RACH procedure the UE 110 may transmit msg1 multiple times using a different PRACH transmit power each time.

To demonstrate the legacy approach, consider a scenario in which M1-M6 of FIG. 6 is less than N6 of FIG. 5. Thus, under conventional circumstances, when the UE 110 switches to the four-step RACH procedure the UE 110 may be configured to perform multiple transmission using a PRACH transmit power that is less than the PRACH transmit power used for the most recently transmitted msgA (e.g., 530). Since the PRACH transmit power N1-N6 utilized for 505-530 did not result in a response from the gNB 120A, it is unlikely that using a lower PRACH transmit power parameter for msg1 (e.g., M1-M6) is to result in a response from gNB 120A. In other words, the legacy approach is inefficient because the UE 110 is configured to utilize parameters for the transmission and retransmission of msg1 that are unlikely to result in a response (e.g., msg2) from the base station.

Returning to the method 400, as mentioned above, the UE 110 may derive the PRACH transmit power for msg1 based on the transmission parameter values used for the failed two-step RACH procedure. For example, the UE 110 may calculate an initial random access preamble transmit power parameter for msg1 based on the transmission parameters of the most recently transmitted msgA. As indicated above, msg1 may be transmitted over the PRACH and thus, the transmit power for msg1 and the PRACH transmit power are similar or the same. In contrast, since msgA comprises a PRACH and PUSCH component, the total transmit power for msgA is greater than the PRACH transmit power for msgA.

MsgA transmit power may be represented by the following equation: $P_{MsgA} = P_{PUSCH} + P_{PRACH} + n*(P_{ramping})$ The parameter $P_{PUSCH}$ represents the transmit power of the msgA PUSCH payload. This parameter may be a function of physical resource block (PRB) size, a modulation and coding scheme (MCS) and a pathloss estimate. The PRB size, MCS and pathloss estimate may be provided by the network via RRC signaling or obtained in any other appropriate manner.

The parameter $P_{PRACH}$ represents the PRACH transmit power for msgA. This parameter may be a function of various network parameters and a pathloss estimate. The parameter n may represent the number of msgA transmission attempts (e.g., 0, 1 . . . msgA-TransMax) and the parameter $P_{ramping}$ represents a network defined power ramping or parameter.

The UE 110 may derive the msg1 transmit power using information associated with the most recently transmitted msgA. Msg1 transmit power may be represented by the following equation: $P_{MSG1} = P_{PRACH} + n*(P_{ramping})$. Under conventional circumstances, $P_{PRACH}$ may be configured by the network. The exemplary embodiments introduce techniques that enable the UE 110 to derive a PRACH transmit power parameter for msg1 that is based on the actual performance of the two-step RACH procedure.

The UE 110 may derive the $P_{PRACH}$ for the msg1 transmission based on the $P_{MsgA} = P_{PUSCH} + P_{PRACH} + n*(P_{ramping})$ used for the most recently transmitted msgA. For example, the UE 110 may subtract the $P_{PUSCH}$ of the most recently transmitted msgA from $P_{MsgA}$ of the most recently transmitted msgA to derive the $P_{MSG1}$ for the initial transmission of msg1. For subsequent transmissions, $P_{MSG1}$ may be increased by the parameter n (e.g., the number of transmission attempts).

Figure 7:
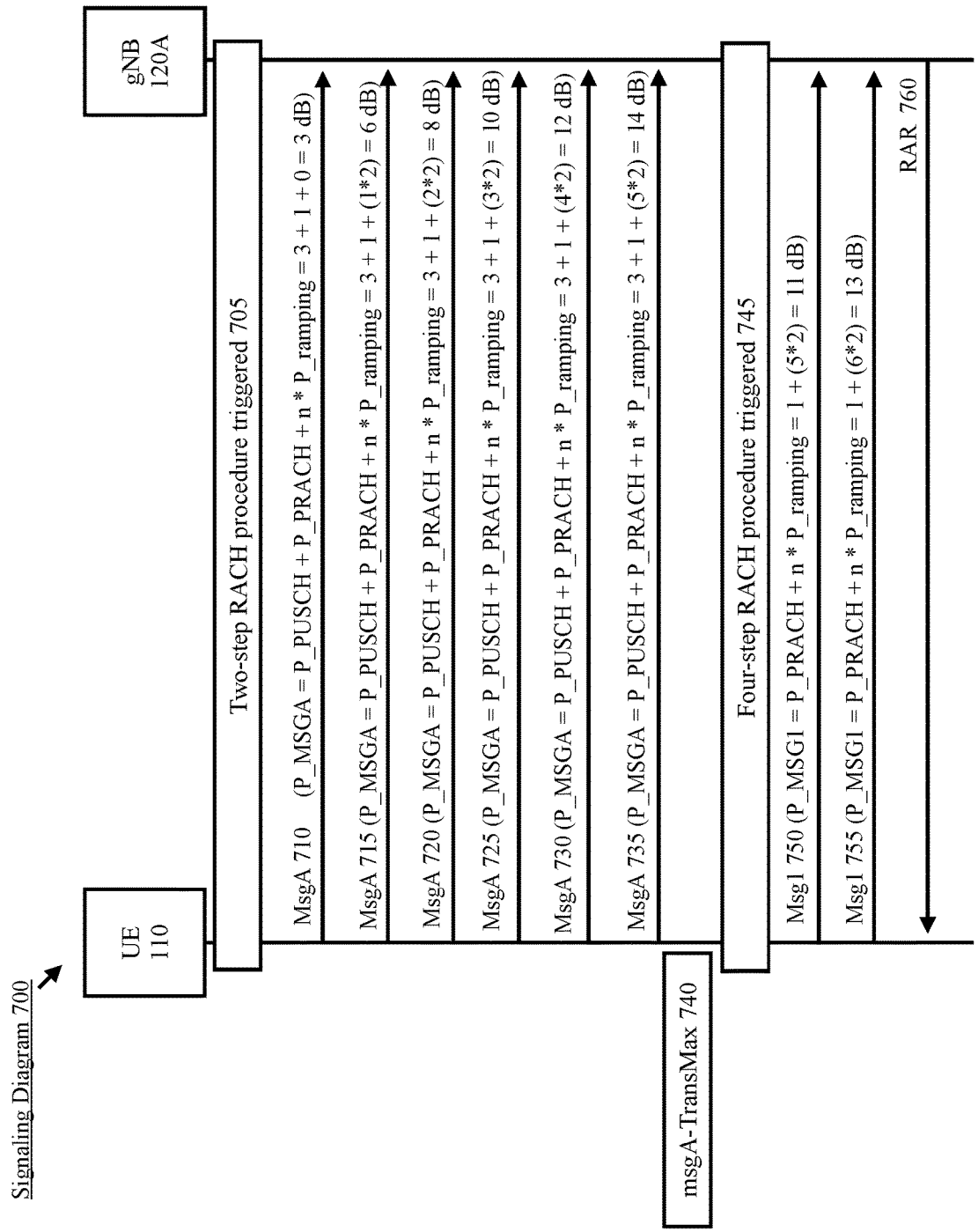
FIG. 7 shows a signaling diagram illustrating an example of deriving a PRACH transmit power parameter value for msg1 of a fallback four-step RACH procedure based on the most recently transmitted msgA according to various exemplary embodiments.

FIG. 7 shows a signaling diagram 700 illustrating an example of deriving a PRACH transmit power parameter value for msg1 of a fallback four-step RACH procedure based on the most recently transmitted msgA. In 705, the two-step RACH procedure is triggered. In 710-735, the UE 110 transmits msgA and in 740, the msgA-TransMax parameter is triggered. This is similar to the signaling diagram 500 of FIG. 5.

To provide an example of how the PRACH transmit power for msg1 may be derived in accordance with the exemplary techniques described herein, simplified example values are shown for each transmission 710-735. These values are not intended to limit the exemplary embodiments in any way and are merely provided to demonstrate the relationship between the failed two-step RACH procedure and the fallback four-step RACH procedure.

As mentioned above, $P_{MsgA} = P_{PUSCH} + P_{PRACH} + n*(P_{ramping})$. For each transmission 710-735, the $P_{PUSCH}$ may be equal to 3 dBs and the $P_{PRACH}$ may be equal to 1 dB. The $P_{MsgA}$ may increase for each subsequent msgA transmission attempt due to the $n*(P_{ramping})$.

In 745, the UE 110 switches to the four-step RACH procedure. In 750, the UE 110 transmits msg1 using a transmit power parameter $P_{MSG1}$ that is derived based on the most recently transmitted msgA. Thus, in this example, the $P_{MSG1}$ for message 750 is the value of $P_{MsgA}$ for transmission 735 minus the $P_{PUSCH}$. Accordingly, instead of using a network assigned parameter for $P_{MSG1}$ like in the legacy approach depicted in FIG. 6, the exemplary embodiments utilize a $P_{MSG1}$ parameter value that is derived based on transmission parameters utilized for the transmission of msgA during the failed two-step RACH procedure.

In 755, the UE 110 retransmits msg1. In this example, it is assumed that the transmission of msg1 in 755 is successfully received by the gNB 120A. As a result, in 760, the UE gNB 120A transmits a RAR to the UE 110. The four-step RACH procedure may then proceed as shown in the signaling diagram 100 of FIG. 1.

In some scenarios, during the two-step RACH procedure, a maximum transmit power level (MTPL) may be reached prior to triggering the msgA-TransMax parameter. As a result, the UE 110 may perform multiple transmissions of msgA using the MTPL. In some embodiments, the UE 110 may fallback to the four-step RACH procedure after performing a transmission during the two-step RACH procedure using the MTPL and before the msgA-TransMax parameter is triggered. Thus, the UE 110 may omit or suppress one or more transmissions during the two-step RACH procedure. This may provide power saving benefits to the UE 110. An example of this is shown in the signaling diagram 800 of FIG. 8.

Figure 8:
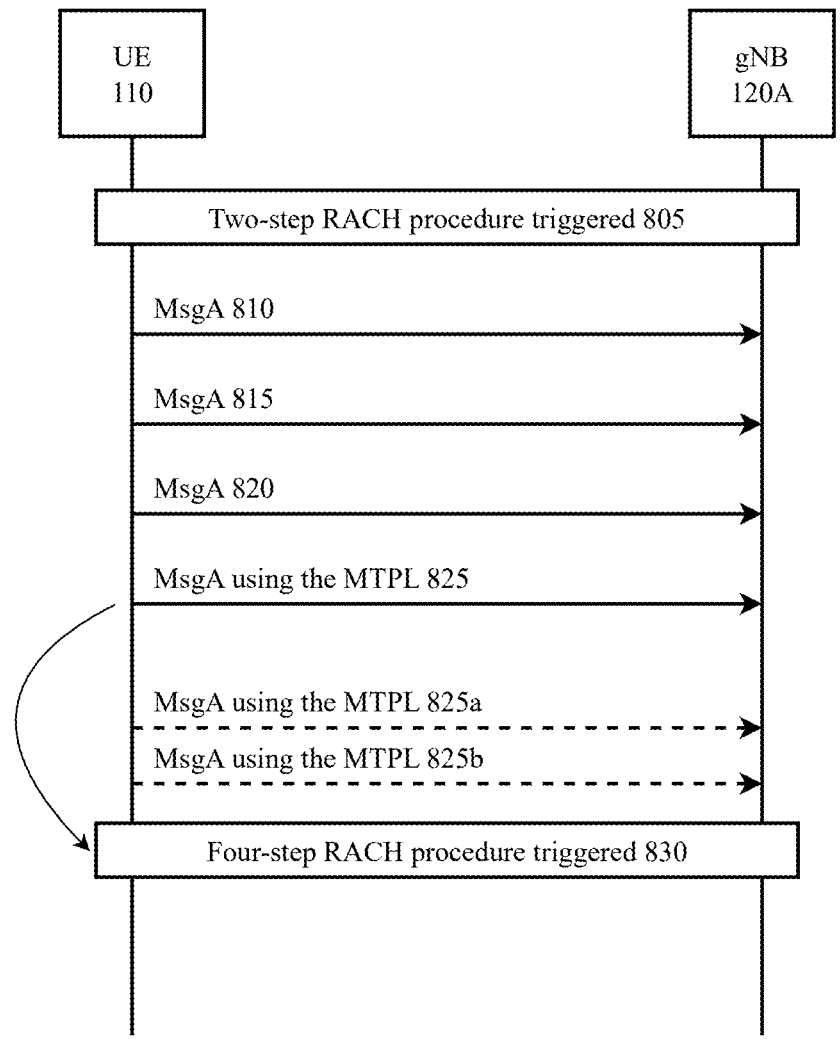
FIG. 8 shows a signaling diagram illustrating an example of triggering the fallback four-step RACH procedure based on the maximum transmission power level (MTPL).

FIG. 8 shows a signaling diagram 800 illustrating an example of triggering the fallback four-step RACH procedure based on the MTPL. The signaling diagram 800 includes the UE 110 and the gNB 120A.

In 805, the two-step RACH procedure is triggered. In 810-820, the UE 110 transmits msgA using a transmission power that is less than the MTPL.

In 825, the UE 110 transmits msgA using the MTPL. At this time, the msgA-TransMax parameter has not been triggered. For instance, in this example, the msgA-TransMax parameter may be set to 6 but the UE 110 has only performed 4 transmissions 810-825. As indicated above, in some embodiments, the UE 110 may transmit msgA using the MTPL until the msgA-TransMax parameter has been triggered. An example of this is shown in the signaling diagram 800 where the UE 110 performs transmissions 825*a* and 825*b* using the MTPL.

However, in 830, the UE 110 triggers the fallback four-step RACH procedure after performing transmission 825 using the MTPL instead of waiting to trigger the msgA-TransMax parameter. Thus, transmissions 825*a* and 825*b* may be omitted or suppressed by the UE 110. This may provide the UE 110 with additional power saving benefits because the UE 110 may avoid performing transmissions that are not likely to lead to a successful RACH procedure, e.g., transmissions 825*a* and 825*b*.

Figure 9:
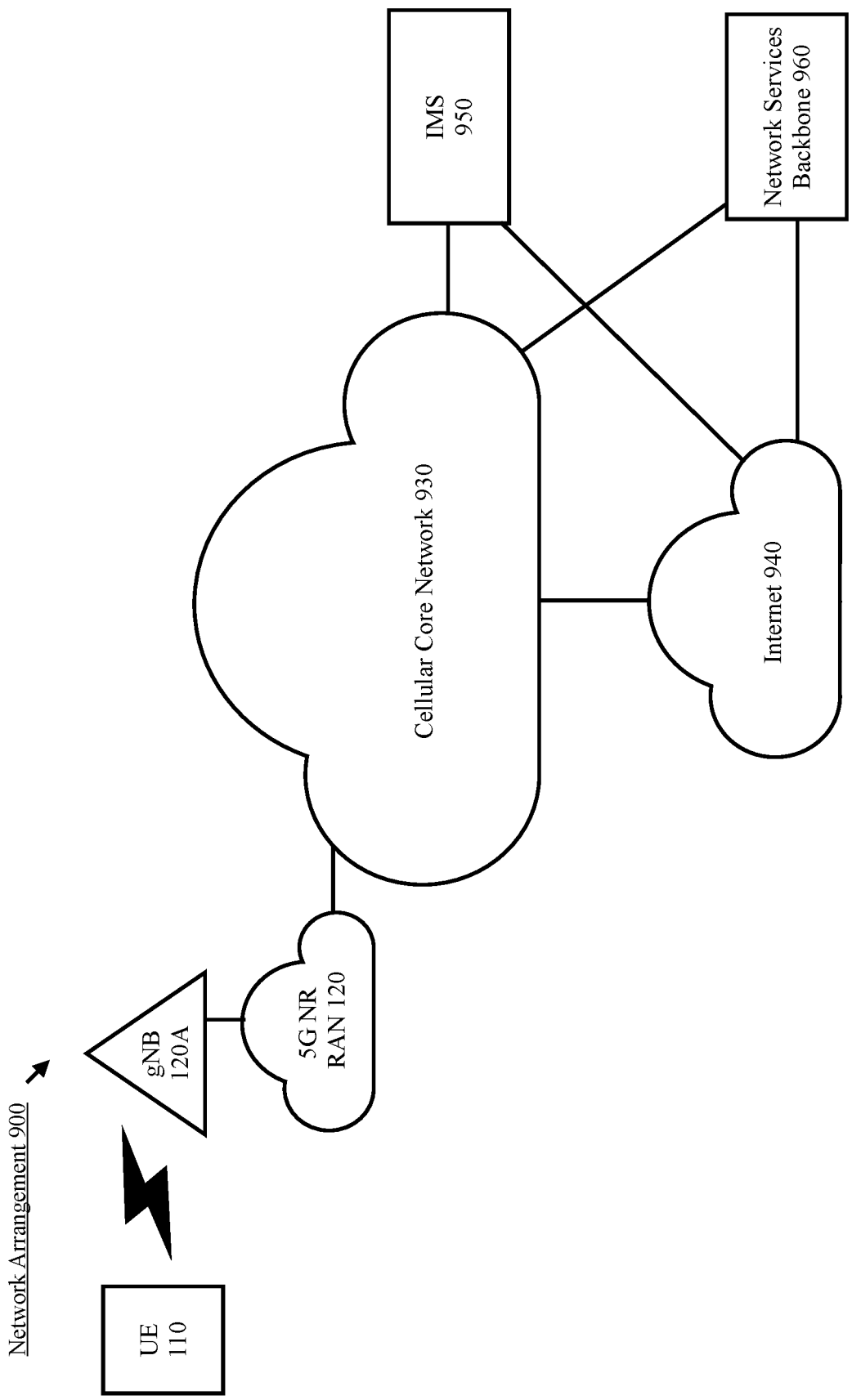
FIG. 9 shows an exemplary network arrangement according to various exemplary embodiments.

FIG. 9 shows an exemplary network arrangement 900 according to various exemplary embodiments. The exemplary network arrangement 900 includes the UE 110. Those skilled in the art will understand that the UE 110 may be any type of electronic component that is configured to communicate via a network, e.g., mobile phones, tablet computers, desktop computers, smartphones, phablets, embedded devices, wearables, Internet of Things (IoT) devices, etc. It should also be understood that an actual network arrangement may include any number of UEs being used by any number of users. Thus, the example of a single UE 110 is merely provided for illustrative purposes.

The UE 110 may be configured to communicate with one or more networks. In the example of the network configuration 100, the network with which the UE 110 may wirelessly communicate is a 5G NR radio access network (RAN) 120. However, the UE 110 may also communicate with other types of networks (e.g., 5G cloud RAN, a next generation RAN (NG-RAN), a long term evolution (LTE) RAN, a legacy cellular network, a WLAN, etc.) and the UE 110 may also communicate with networks over a wired connection. With regard to the exemplary embodiments, the UE 110 may establish a connection with the 5G NR RAN 120. Therefore, the UE 110 may have a 5G NR chipset to communicate with the 5G NR RAN 120.

The 5G NR RAN 120 may be a portion of a cellular network that may be deployed by a network carrier (e.g., Verizon, AT&T, T-Mobile, etc.). The 5G NR RAN 120 may include, for example, nodes, cells or base stations (e.g., Node Bs, eNodeBs, HeNBs, eNBS, gNBs, gNodeBs, macrocells, microcells, small cells, femtocells, etc.) that are configured to send and receive traffic from UEs that are equipped with the appropriate cellular chip set.

Those skilled in the art will understand that any association procedure may be performed for the UE 110 to connect to the 5G NR-RAN 120. For example, as discussed above, the 5G NR-RAN 120 may be associated with a particular cellular provider where the UE 110 and/or the user thereof has a contract and credential information (e.g., stored on a SIM card). Upon detecting the presence of the 5G NR-RAN 120, the UE 110 may transmit the corresponding credential information to associate with the 5G NR-RAN 120. More specifically, the UE 110 may associate with a specific base station, e.g., e.g., the next generation Node B (gNB) 120A.

The network arrangement 900 also includes a cellular core network 930, the Internet 940, an IP Multimedia Subsystem (IMS) 950, and a network services backbone 960. The cellular core network 930 may be considered to be the interconnected set of components that manages the operation and traffic of the cellular network. It may include the evolved packet core (EPC) and/or the 5G core (5GC). The cellular core network 930 also manages the traffic that flows between the cellular network and the Internet 940. The IMS 950 may be generally described as an architecture for delivering multimedia services to the UE 110 using the IP protocol. The IMS 950 may communicate with the cellular core network 930 and the Internet 940 to provide the multimedia services to the UE 110. The network services backbone 960 is in communication either directly or indirectly with the Internet 940 and the cellular core network 930. The network services backbone 960 may be generally described as a set of components (e.g., servers, network storage arrangements, etc.) that implement a suite of services that may be used to extend the functionalities of the UE 110 in communication with the various networks.

Figure 10:
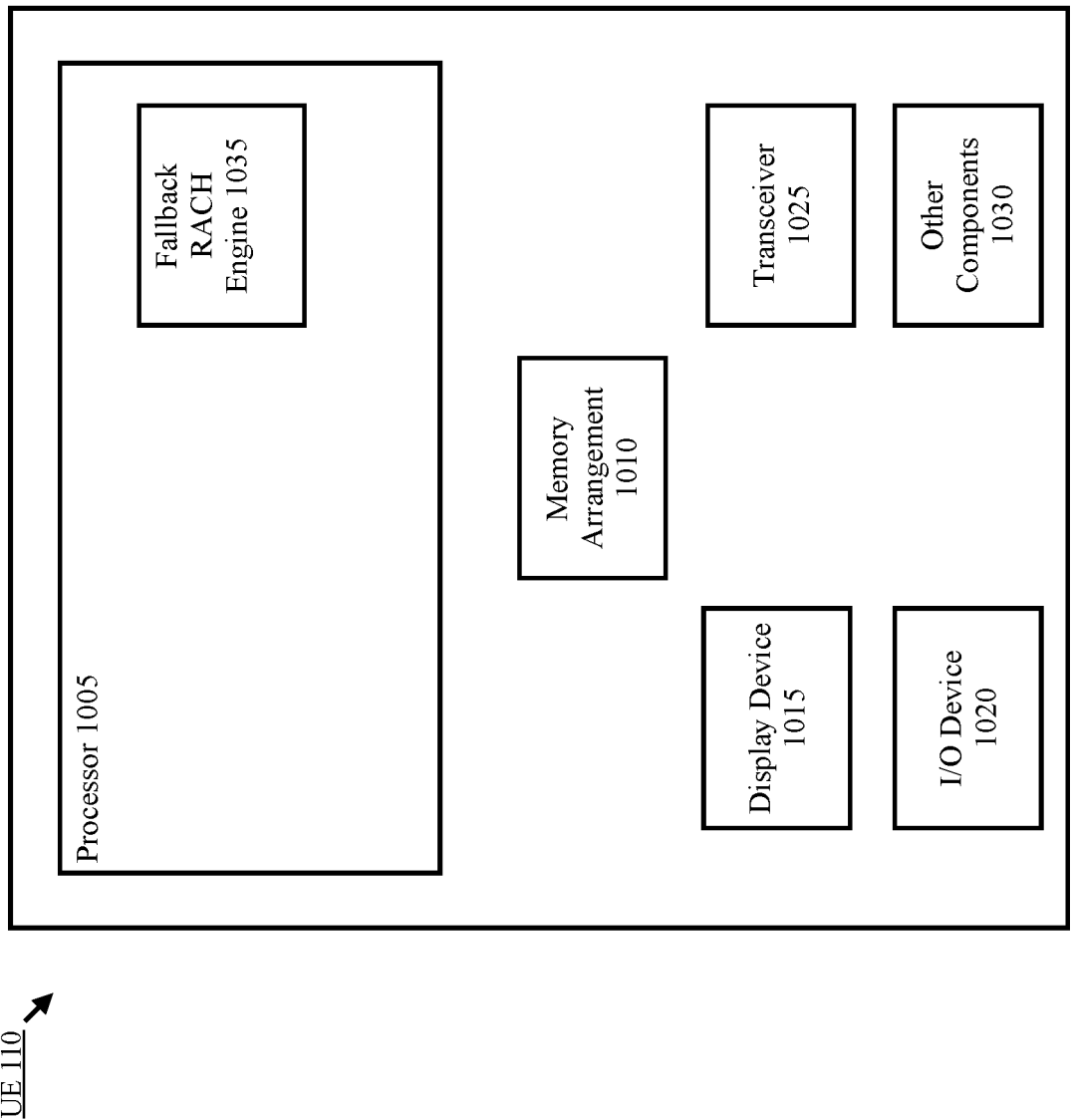
FIG. 10 shows an exemplary user equipment (UE) according to various exemplary embodiments.

FIG. 10 shows an exemplary UE 110 according to various exemplary embodiments. The UE 110 will be described with regard to the network arrangement 900 of FIG. 9. The UE 110 may include a processor 1005, a memory arrangement 1010, a display device 1015, an input/output (I/O) device 1020, a transceiver 1025 and other components 1030. The other components 1030 may include, for example, an audio input device, an audio output device, a power supply, a data acquisition device, ports to electrically connect the UE 110 to other electronic devices, etc.

The processor 905 may be configured to execute a plurality of engines of the UE 110. For example, the engines may include a fallback RACH engine 935. The fallback RACH engine 935 may perform various operations related to a fallback four-step RACH procedure including, but not limited to, receiving configuration information, deriving transmit power parameters for msg1 and triggering the switch from the two-step RACH procedure to the four-step RACH procedure.

The above referenced engine 935 being an application (e.g., a program) executed by the processor 905 is merely provided for illustrative purposes. The functionality associated with the engine 935 may also be represented as a separate incorporated component of the UE 110 or may be a modular component coupled to the UE 110, e.g., an integrated circuit with or without firmware. For example, the integrated circuit may include input circuitry to receive signals and processing circuitry to process the signals and other information. The engines may also be embodied as one application or separate applications. In addition, in some UEs, the functionality described for the processor 905 is split among two or more processors such as a baseband processor and an applications processor. The exemplary embodiments may be implemented in any of these or other configurations of a UE.

The memory arrangement 910 may be a hardware component configured to store data related to operations performed by the UE 110. The display device 915 may be a hardware component configured to show data to a user while the I/O device 1020 may be a hardware component that enables the user to enter inputs. The display device 1015 and the I/O device 1020 may be separate components or integrated together such as a touchscreen. The transceiver 1025 may be a hardware component configured to establish a connection with the 5G NR-RAN 120, an LTE-RAN (not pictured), a legacy RAN (not pictured), a WLAN (not pictured), etc. Accordingly, the transceiver 1025 may operate on a variety of different frequencies or channels (e.g., set of consecutive frequencies).

Figure 11:
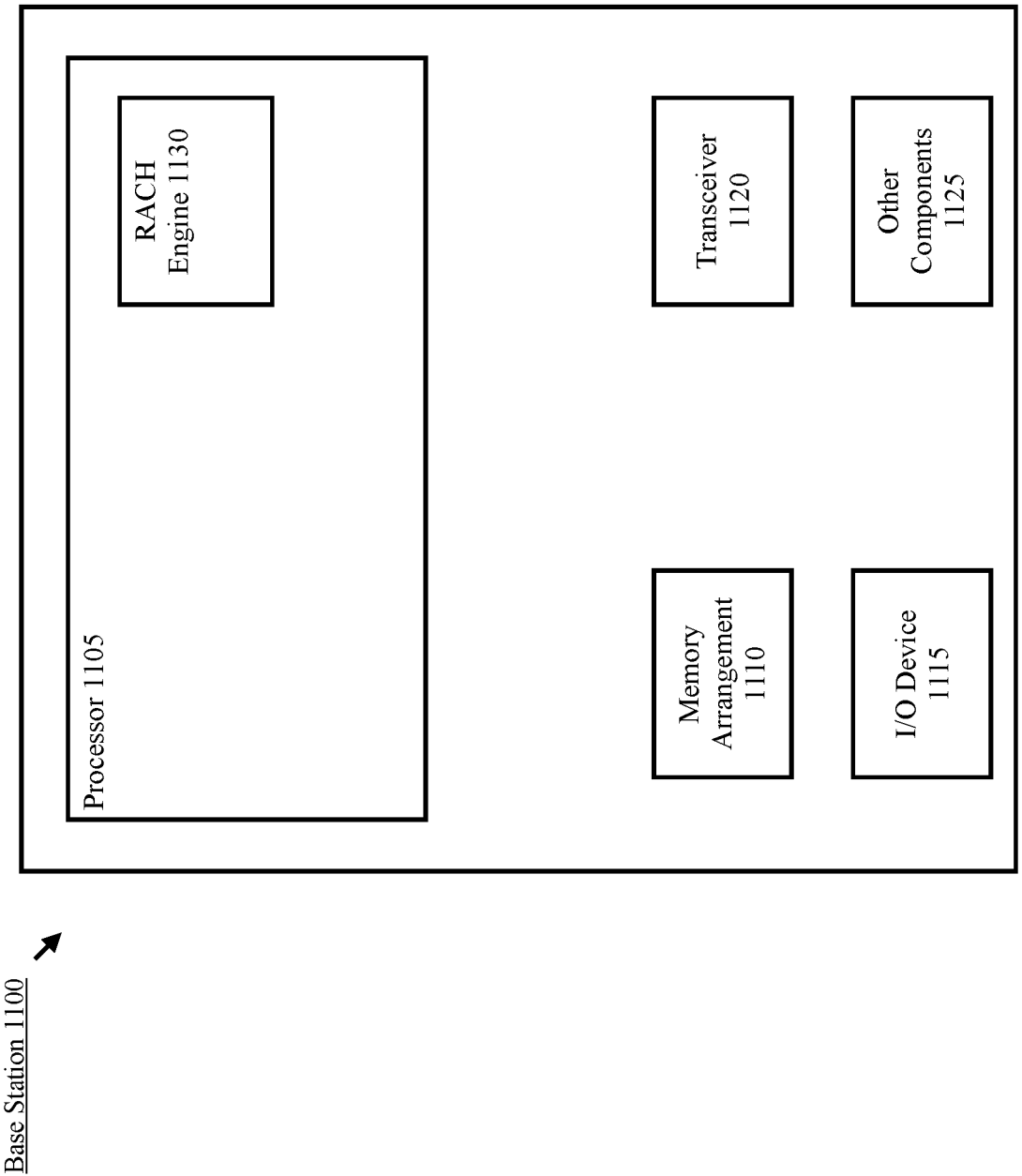
FIG. 11 shows an exemplary base station according to various exemplary embodiments.

FIG. 11 shows an exemplary base station 1100 according to various exemplary embodiments. The base station 1100 may represent the gNB 120A or any other type of access node through which the UE 110 may establish a connection and manage network operations.

The base station 1100 may include a processor 1105, a memory arrangement 1110, an input/output (I/O) device 1115, a transceiver 1120, and other components 1125. The other components 1125 may include, for example, an audio input device, an audio output device, a battery, a data acquisition device, ports to electrically connect the base station 1100 to other electronic devices, etc.

The processor 1105 may be configured to execute a plurality of engines of the base station 1100. For example, the engines may include a RACH engine 1130. The RACH engine 1130 may perform various operations related to two-step RACH and four-step RACH procedures.

The above noted engine 1130 being an application (e.g., a program) executed by the processor 1105 is only exemplary. The functionality associated with the engine 1130 may also be represented as a separate incorporated component of the base station 1100 or may be a modular component coupled to the base station 1100, e.g., an integrated circuit with or without firmware. For example, the integrated circuit may include input circuitry to receive signals and processing circuitry to process the signals and other information. In addition, in some base stations, the functionality described for the processor 1105 is split among a plurality of processors (e.g., a baseband processor, an applications processor, etc.). The exemplary embodiments may be implemented in any of these or other configurations of a base station.

The memory 1110 may be a hardware component configured to store data related to operations performed by the base station 1100. The I/O device 1115 may be a hardware component or ports that enable a user to interact with the base station 1100. The transceiver 1120 may be a hardware component configured to exchange data with the UE 110 and any other UE in the network arrangement 900. The transceiver 1120 may operate on a variety of different frequencies or channels (e.g., set of consecutive frequencies). Therefore, the transceiver 1120 may include one or more components (e.g., radios) to enable the data exchange with the various networks and UEs.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. The exemplary embodiments of the above described method may be embodied as a program containing lines of code stored on a non-transitory computer readable storage medium that, when compiled, may be executed on a processor or microprocessor.

Although this application described various embodiments each having different features in various combinations, those skilled in the art will understand that any of the features of one embodiment may be combined with the features of the other embodiments in any manner not specifically disclaimed or which is not functionally or logically inconsistent with the operation of the device or the stated functions of the disclosed embodiments.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

What is claimed:

1. A processor of a user equipment (UE) configured to perform operations comprising:
    initiating a two-step random access channel (RACH) procedure to synchronize with a base station;
    deriving a first physical random access channel (PRACH) transmit power parameter value for a transmission to be made during the two-step RACH procedure based on at least a physical uplink shared channel (PUSCH) payload transmit power parameter and a total transmit power parameter;
    initiating a fallback four-step RACH procedure after the two-step RACH procedure;
    configuring a random access preamble transmission for the four-step RACH procedure, wherein configuring the random access preamble transmission comprises deriving a second PRACH transmit power parameter value for a transmission to be made during the four-step RACH procedure based on at least the first PRACH transmit power parameter value; and
    transmitting the random access preamble for the four-step RACH procedure to the base station.

2. The processor of claim 1, wherein the transmission to be made during the two-step RACH procedure is a most recently transmitted msgA.

3. The processor of claim 2, wherein deriving the first PRACH transmit power parameter comprises subtracting the PUSCH payload transmit power parameter value from the total transmit power parameter value corresponding to the most recently transmitted msgA.

4. The processor of claim 1, wherein initiating the fallback four-step RACH procedure is triggered based on utilizing a maximum transmit power level (MTPL) during the two-step RACH procedure and wherein the fallback four-step RACH procedure occurs before a maximum number of transmissions has been performed by the UE during the two-step RACH procedure.

5. The processor of claim 1, wherein the UE suppresses one or more configured transmissions during the two-step RACH procedure.

6. The processor of claim 1, wherein the PUSCH payload transmit power parameter is a function of physical resource block (PRB) size, a modulation and coding scheme (MCS) and a pathloss estimate.

7. The processor of claim 6, wherein the PRB size, MCS and pathloss estimate are received via radio resource control (RRC) signaling.

8. A user equipment (UE), comprising:
a transceiver configured to communicate with a base station; and
a processor communicatively coupled to the transceiver and configured to perform operations comprising:
  initiating a two-step random access channel (RACH) procedure to synchronize with the base station;
  deriving a first physical random access channel (PRACH) transmit power parameter value for a transmission to be made during the two-step RACH procedure based on at least a physical uplink shared channel (PUSCH) payload transmit power parameter and a total transmit power parameter of the first transmission;
  initiating a fallback four-step RACH procedure after the two-step RACH procedure;
  configuring a random access preamble transmission for the four-step RACH procedure, wherein configuring the random access preamble transmission comprises deriving a second PRACH transmit power parameter value for a transmission to be made during the four-step RACH procedure based on at least the first PRACH transmit power parameter value; and
  transmitting the random access preamble for the four-step RACH procedure to the base station.

9. The UE of claim 8, wherein the transmission to be made during the two-step RACH procedure is a most recently transmitted msgA.

10. The UE of claim 9, wherein deriving the first PRACH transmit power parameter comprises subtracting the PUSCH payload transmit power parameter value from the total transmit power parameter value corresponding to the most recently transmitted msgA.

11. The UE of claim 8, wherein initiating the fallback four-step RACH procedure is triggered based on utilizing a maximum transmit power level (MTPL) during the two-step RACH procedure and wherein the fallback four-step RACH procedure occurs before a maximum number of transmissions has been performed by the UE during the two-step RACH procedure.

12. The UE of claim 8, wherein the UE suppresses one or more configured transmissions during the two-step RACH procedure.

13. The UE of claim 8, wherein the PUSCH payload transmit power parameter is a function of physical resource block (PRB) size, a modulation and coding scheme (MCS) and a pathloss estimate and wherein the PRB size, MCS and pathloss estimate are received via radio resource control (RRC) signaling.

14. A method, comprising:
initiating a two-step random access channel (RACH) procedure to synchronize with a base station;
initiating a fallback four-step RACH procedure after the two-step RACH procedure;
deriving a first physical random access channel (PRACH) transmit power parameter value for a transmission to be made during the two-step RACH procedure based on at least a physical uplink shared channel (PUSCH) payload transmit power parameter and a total transmit power parameter of the first transmission;
configuring a random access preamble transmission for the four-step RACH procedure wherein configuring the random access preamble transmission comprises deriving a second PRACH transmit power parameter value for a transmission to be made during the four-step RACH procedure based on at least the first RACH transmit power parameter value; and
transmitting the random access preamble for the four-step RACH procedure to the base station.

15. The method of claim 14, wherein the transmission to be made during the two-step RACH procedure is a most recently transmitted msgA.

16. The method of claim 15, wherein deriving the first PRACH transmit power parameter comprises subtracting the PUSCH payload transmit power parameter value from the total transmit power parameter value corresponding to the most recently transmitted msgA.

17. The method of claim 14, wherein initiating the fallback four-step RACH procedure is triggered based on utilizing a maximum transmit power level (MTPL) during the two-step RACH procedure and wherein the fallback four-step RACH procedure occurs before a maximum number of transmissions has been performed during the two-step RACH procedure.

18. The method of claim 14, further comprising:
suppressing one or more configured transmissions during the two-step RACH procedure.

19. The method of claim 14, wherein the PUSCH payload transmit power parameter is a function of physical resource block (PRB) size, a modulation and coding scheme (MCS) and a pathloss estimate.

20. The method of claim 19, wherein the PRB size, MCS and pathloss estimate are received via radio resource control (RRC) signaling.

* * * * *